United States Patent
Lindoff et al.

(10) Patent No.: US 9,585,179 B2
(45) Date of Patent: Feb. 28, 2017

(54) RADIO LINK MANAGEMENT FOR NETWORK ASSISTED DEVICE-TO-DEVICE COMMUNICATION

(71) Applicant: Telefonaktiebolaget L M Ericsson (publ), Stockholm (SE)

(72) Inventors: Bengt Lindoff, Bjarred (SE); Leif Wilhelmsson, Dalby (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 14/399,950

(22) PCT Filed: May 3, 2013

(86) PCT No.: PCT/EP2013/059265
§ 371 (c)(1),
(2) Date: Nov. 8, 2014

(87) PCT Pub. No.: WO2013/171078
PCT Pub. Date: Nov. 21, 2013

(65) Prior Publication Data
US 2015/0099511 A1    Apr. 9, 2015

Related U.S. Application Data (60) Provisional application No. 61/646,981, filed on May 15, 2012.

(30) Foreign Application Priority Data

May 15, 2012    (EP) .................................... 12167971

(51) Int. Cl.
*H04W 76/02* (2009.01)
*H04W 24/08* (2009.01)
(Continued)

(52) U.S. Cl.
CPC ......... *H04W 76/023* (2013.01); *H04W 24/08* (2013.01); *H04W 56/001* (2013.01); *H04W 76/028* (2013.01); *H04W 88/06* (2013.01)

(58) Field of Classification Search
None
See application file for complete search history.

(56) References Cited

U.S. PATENT DOCUMENTS

2004/0058682 A1    3/2004  Kitchin
2005/0239451 A1*  10/2005  Periyalwar .......... H04W 52/383
                                                                455/425
(Continued)

FOREIGN PATENT DOCUMENTS

EP    2384068 A1    11/2011
WO    2010035100 A1    4/2010

OTHER PUBLICATIONS

Design Aspects of Network Assisted Device-to-Device Communications by Fodor et al., dated Mar. 2012.*
(Continued)

*Primary Examiner* — Daniel Lai
(74) *Attorney, Agent, or Firm* — Leffler Intellectual Property Law, PLLC (57) ABSTRACT

A method of a first wireless communication device adapted to perform network assisted device-to-device communication is disclosed, wherein a device-to-device communication connection comprises a device-to-device communication link between the first wireless communication device and a second wireless communication device and a device-to-network communication link between the first wireless communication device and a network node. The method comprises monitoring a synchronization of the device-to-device communication link and transmitting a device-to-device communication link report to the network node over the device-to-network communication link if the synchro- (Continued)

nization of the device-to-device communication link is lost. The method also comprises monitoring a synchronization of the device-to-network communication link and adapting) a communication of the device-to-device communication link if the synchronization of the device-to-network communication link is lost. Corresponding computer program product, arrangement and wireless communication device are also disclosed.

14 Claims, 4 Drawing Sheets

(51) Int. Cl.
*H04W 56/00* (2009.01)
*H04W 88/06* (2009.01)

(56) References Cited

U.S. PATENT DOCUMENTS

| 2006/0165035 | A1 | 7/2006 | Chandra et al. |
| 2010/0080199 | A1 | 4/2010 | Jim et al. |
| 2011/0098043 | A1* | 4/2011 | Yu ............... H04W 60/00 455/435.1 |
| 2011/0306349 | A1 | 12/2011 | Hakola et al. |
| 2012/0083283 | A1 | 4/2012 | Phan et al. |
| 2012/0113844 | A1* | 5/2012 | Krishnamurthy ..... H04L 1/0026 370/252 |
| 2013/0150051 | A1* | 6/2013 | Van Phan ............. H04W 12/04 455/437 |
| 2013/0159407 | A1* | 6/2013 | Koskela ............. H04L 67/1063 709/204 |

OTHER PUBLICATIONS

Device-to-Device Communication as an Underlay to LTE-Advanced Networks by Doppler et al., dated Dec. 2009.*
PCT International Search Report, mailed Jun. 18, 2013, in connection with International Application No. PCT/EP2013/059265, all pages.
PCT Written Opinion, mailed Jun. 18, 2013, in connection with International Application No. PCT/EP2013/059265, all pages.
Extended European Search Report, mailed Sep. 21, 2012, in connection with European Patent Application No. 12167971.6-2412, all pages.
International Preliminary Report on Patentability, mailed Nov. 27, 2014, in connection with International Application No. PCT/EP2013/059265, all pages.
Bacceli, Francois et al. "On the Design of Device-to-Device Autonomous Discovery" IEEE 2012 Fourth International Conference on Communication Systems & Networks (COMSNETS), Jan. 3-7, 2012, pp. 1-9, ISBN: 978-1-4673-0296-8.
Doppler, Klaus et al. "Advances in D2D Communications: Energy Efficient Service and Device Discovery Radio" IEEE 2011 Second International Conference on Wireless Communication, Vehicular Technology, Information Theory and Aerospace & Electronic Systems Technology (Wireless VITAE) Feb. 28, 2011-Mar. 3, 2011, pp. 1-6, ISBN: 978-1-4577-0786-5.
Janis, Pekka et al. "Interference-avoiding MIMO Schemes for device-to-device radio underlaying cellular networks" IEEE 2009 20th International Symposium on Personal, Indoor & Mobile Radio Communications Sep. 13-16, 2009, pp. 2385-2389, ISBN: 978-1-4244-5122-7, ISBN: 978-1-4244-5122-7.

* cited by examiner

RADIO LINK MANAGEMENT FOR NETWORK ASSISTED DEVICE-TO-DEVICE COMMUNICATION

CROSS-REFERENCE TO RELATED APPLICATIONS

This application claims priority under 35 U.S.C. §119 to European Patent Application No. 12167971.6, filed May 15, 2012, which is hereby incorporated herein by reference in its entirety. This application also claims the benefit of U.S. Provisional Application No. 61/646,981, filed May 15, 2012, which is hereby incorporated herein by reference in its entirety.

TECHNICAL FIELD

The present invention relates generally to the field of network assisted device to device communication. More particularly, it relates to radio link management of such communication.

BACKGROUND

Device-to-Device (D2D) communication refers to direct communication between devices. In D2D communication, data to be transmitted from a first device to a second device is typically not relayed via any cellular network. Some examples of D2D communication of the prior art are Bluetooth communication, FlashlinQ communication, WLAN (e.g. IEEE 802.11) communication (e.g. WIFI Direct).

Device-to-device communication may be applicable in various scenarios. One scenario is when a cellular radio access network is present, and able to set up a cellular connection between two devices. D2D communication may be a complement to the cellular communication in such scenarios.

There may be situations when D2D communication may provide better performance (better signal quality, higher bit rate, lower latency, etc) than cellular communication. This may be due to proximity between the devices and/or specific signaling gain of the D2D protocol (e.g. hop gain).

In some situations, the network may have constraints (e.g. due to being heavily loaded) resulting in that a service cannot be provided at all using a network connection. Then, D2D communication would be an alternative.

There may also be situations when D2D communication may be preferred by the user of a device (e.g. due to billing costs).

D2D communication may improve spectrum efficiency and reduce the network load for the cellular network, since the D2D connection typically uses another spectrum range (e.g. an unlicensed spectrum) than the cellular network (typically licensed spectrum). Furthermore, since cellular communication uses an uplink-downlink pair for each of the two devices while a D2D connection would only use one link pair, spectrum efficiency is improved even if the D2D connection would use cellular spectrum resources. This would be true even for network assisted D2D communication where most of the data would be transmitted over the D2D connection and only a small mount of information is to be transmitted over the network link.

D2D communication may be ad hoc or may be network assisted. For example, a cellular network may assist a D2D connection by establishing security of the D2D link and/or partly or fully controlling the setup of the D2D connection (e.g. device/peer discovery and resource allocation). A cellular network may also assist D2D communication by controlling the interference environment. For example, if using licensed operator's spectrum for the D2D communication, higher reliability can be provided than when operating in unlicensed spectrum. To assist the D2D connection, the network may also provide synchronization and/or partial or full Radio Resource Management (RRM—may e.g. comprise time and/or frequency resource allocation for the D2D communication).

In a typical cellular communication system there are standardized procedures for connection setup and connection release (disconnection). There are typically also defined procedures for how to act in radio link failure, a scenario when a radio link is lost in an uncontrolled way (without concoction release being performed). Such scenarios may be encountered e.g. when a device goes out of coverage, due to erroneous device operation, due to battery removal, etc.

Radio link monitoring procedures is typically defined for prior art cellular systems. Such procedures may include the device monitoring the radio channel and synchronization status with the network and define how to proceed of e.g. the synchronization is lost.

For example in WCDMA and LTE, the wireless communication device monitors the down link (DL) channel conditions and determines whether the DL is in-sync or out-of-sync. This determination may be based on whether or device can reliable decode the DL information. If out-of-sync is detected, the device is to perform a number of actions, e.g. start higher layer connection release timers (indicating how long the device should try to re-synchronize before performing a formal connection release) and set transmission constraints (to limit the potential interference caused by the device if transmitting without reliable detection of DL power control information).

Prior art radio link monitoring procedures (e.g. out-of-sync procedures) typically refers to single connection, e.g. between the mobile device and the network.

Therefore, there is a need for approaches to radio link monitoring (e.g. out-of-sync procedures) for network assisted device-to-device communication.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of the invention to obviate at least some of the above disadvantages and to provide radio link monitoring and out-of-sync procedures for network assisted device-to-device communication.

According to a first aspect this is achieved by a method of a first wireless communication device adapted to perform network assisted device-to-device communication, wherein a device-to-device communication connection comprises a device-to-device communication link between the first wireless communication device and a second wireless communication device and a device-to-network communication link between the first wireless communication device and a network node. The method comprises monitoring a synchronization of the device-to-device communication link and transmitting a device-to-device communication link report to the network node over the device-to-network communication link if the synchronization of the device-to-device communication link is lost. The method also comprises monitoring a synchronization of the device-to-network communication link and adapting a communication of the device-to-device communication link if the synchronization of the device-to-network communication link is lost.

That a synchronization of a link is lost may, for example, be defined as a signal quality value (e.g. SIR, SNR, SINR, etc.) falling below a threshold or as a signal quality value (e.g. BER, BLER, etc.) falling above a threshold. Another example definition is that the quality of service is not sufficient for an ongoing, requested, or prospect service.

The device-to-device communication link report may comprise one or more of a synchronization lost report and a zero quality report.

The method may further comprise, if the synchronization of the device-to-device communication link is lost, ceasing communication over the device-to-device communication link.

In some embodiments, adapting a communication of the device-to-device communication link may comprise one or more of transmitting a synchronization lost report to the second wireless communication device over the device-to-device communication link, and ceasing communication over the device-to-device communication link.

Ceasing communication over the device-to-device link may comprise ceasing communication in both directions or only in one direction.

The synchronization lost report to the second wireless communication device may, in some embodiments, be relayed to the network node over the device-to-network communication link of the second wireless communication device.

In some embodiments, the method may further comprise determining whether the synchronization of the device-to-device communication link is lost and determining whether the synchronization of the device-to-network communication link is lost based on a signal quality of a signal received over the respective communication link.

A second aspect comprises an arrangement of a first wireless communication device adapted to perform network assisted device-to-device communication, wherein a device-to-device communication connection comprises a device-to-device communication link between the first wireless communication device and a second wireless communication device and a device-to-network communication link between the first wireless communication device and a network node.

The arrangement comprises a transceiver adapted to communicate over the device-to-device communication link and the device-to-network communication link, and a synchronization monitor adapted to monitor a synchronization of the device-to-device communication link and a synchronization of the device-to-network communication link. The arrangement also comprises a controller adapted to cause the transceiver to transmit a device-to-device communication link report to the network node over the device-to-network communication link if the synchronization of the device-to-device communication link is lost and adapted to cause the transceiver to adapt a communication of the device-to-device communication link if the synchronization of the device-to-network communication link is lost.

The transceiver may be further adapted to receive a synchronization lost report from the second wireless communication device over the device-to-device communication link and to transmit the received synchronization lost report to the network node over the device-to-network communication link.

A third aspect comprises a wireless communication device adapted to perform device-to-device communication and comprising the arrangement of the second aspect.

A fourth aspect comprises a computer program product comprising a computer readable medium, having thereon a computer program comprising program instructions, the computer program being loadable into a data-processing unit and adapted to cause execution of the method according to the first aspect when the computer program is run by the data-processing unit.

In some embodiments, the second aspect may additionally have features identical with or corresponding to any of the various features as explained above for the first aspect.

An advantage of some embodiments is that radio link monitoring and out-of-sync procedures are provided for network assisted device-to-device communication.

Another advantage of some embodiments is that the risk of uncontrolled interference in out-of-sync scenarios is reduced.

Yet another advantage of some embodiments is that synchronization actions may be imposed by the network even when one link has failed. This provides the further advantage that re-synchronization may be facilitated.

BRIEF DESCRIPTION OF THE DRAWINGS

Further objects, features and advantages will appear from the following detailed description of embodiments, with reference being made to the accompanying drawings, in which.

DETAILED DESCRIPTION

It is noted that D2D protocols/communication/connection when used herein relates to any known or future suitable D2D application. Examples include, but are not limited to, Bluetooth, WLAN (WIFI Direct), FlashlinQ, and D2D using cellular spectrum. For example, a network assisted D2D communication may use uplink and/or downlink resources of the cellular spectrum as allocated by the network node. The D2D communication may be TDD or FDD. The network node may impose restrictions on the D2D communication (particularly when cellular and/or licensed spectrum is used), e.g. power control such as a maximum allowed transmission power and/or power control commands.

Similarly, it is noted that cellular protocols/communication/connection when used herein relates to any known or future suitable cellular application. Examples include, but are not limited to, 3GPP cellular standards (e.g. GSM, WCDMA/HSPA, TD-SCDMA, LTE), WLAN, and even device-to-device networks. A network node may, for example, comprise a base station, a NodeB, an eNodeB, or a WLAN access point.

A network node may be any suitable part of a network (e.g. a serving or controlling node), e.g. a cellular base station, a relay node, a wireless access point, or a core network node.

In the following, embodiments will be described where a wireless communication device engaged in network assisted device-to-device communication monitors both a device-to-device communication link (e.g. for information data and possibly control signaling) and a device-to-network link (e.g. for control signaling). The monitoring includes detecting out-of-synchronization if it appears on either link.

Out-of-synchronization of a link may be defined in any suitable way. For example, it may be when the signal quality is no longer sufficient for reliable detection of the data received over the link. The signal quality of a signal received over the respective communication link may, for example, be measured as SIR, SNR, SNIR, BER, BLER, CRC, etc. In WCDMA, the signal quality could be estimated based on pilot SIR, for example, and in LTE, the signal quality could be estimated based on a hypothetical PDCCH BLER, for example.

The connections of the device-to-device link and the device-to-network link may typically use the same carrier frequency (possibly with different frequency allocations within the system bandwidth). However, embodiments are equally applicable in situations when a first carrier frequency is used for the device-to-network connection and a second carrier frequency is used for the device-to-device connection, and even when different radio access technologies are used for the two connections.

The activity on the device-to-network connection could typically be sparse compared to the device-to-device connection (e.g. transmission/reception in the order of every 100 ms), or it may be in the same order as for the device-to-device connection (e.g. transmission/reception in the order of 10 ms).

When an out-of-sync event is detected for one of the links, the device performs an out-of-sync action in relation to (e.g. on) the other link.

For example, when the device-to-device communication link is out-of-sync, the device may transmit a report indicative of this fact to the network node over the device-to-network link. The report may comprise a synchronization lost report and/or a zero quality report. A zero quality report may comprise an indication that communication over the link is impossible. For example, a zero quality report may comprise a CQI (channel quality indication) value equal to 0 (or −1) which means that the quality is below a threshold relating to maintaining the connection (or relating to providing sufficient quality of service).

Furthermore, the device may receive synchronization action instructions in a report from the network over the device-to-network link. Such instructions may include information on how to find the lost synchronization, a timing reference, instructions to send or listen to a reference signal (e.g. beacon), instructions to switch to cellular communication, instructions to switch to other carrier frequency and/or radio access technology, etc. The device may also halt all (or part of the) communication on the device-to-device link (on its own initiative or as instructed by the network) until synchronization is re-established. This has the advantage that uncontrolled interference generation is minimized. In particular, if the network assisted device-to-device communication includes power control being provided by the network (e.g. if a licensed cellular spectrum is used for the device-to-device link), it may be hazardous to continue device-to-device transmission when not being able to receive control information from the network.

When the device-to-network communication link is out-of-sync, the device may, for example, transmit a report indicative of this fact to the network node via the device-to-device link. Such a report may be relayed to the network node by the other device of the device-to-device communication. The relaying is optional. In some embodiments, the device may transmit the report to the other device via the device-to-device link and the other device does not relay it to the network node. The report may comprise a synchronization lost report. Furthermore, the device may receive synchronization action instructions in a report from the network over the device-to-device link (relayed by the other device). Such instructions may include information on how to find the lost synchronization, a timing reference, instructions to listen to a reference signal (e.g. beacon), instructions to switch to cellular communication, instructions to switch to other carrier frequency and/or radio access technology, etc. The device may, additionally or alternatively, halt all (or part of the) communication on the device-to-device link (on its own initiative or as instructed by the network) until synchronization is re-established. This has similar advantages as described above.

Figure 1:
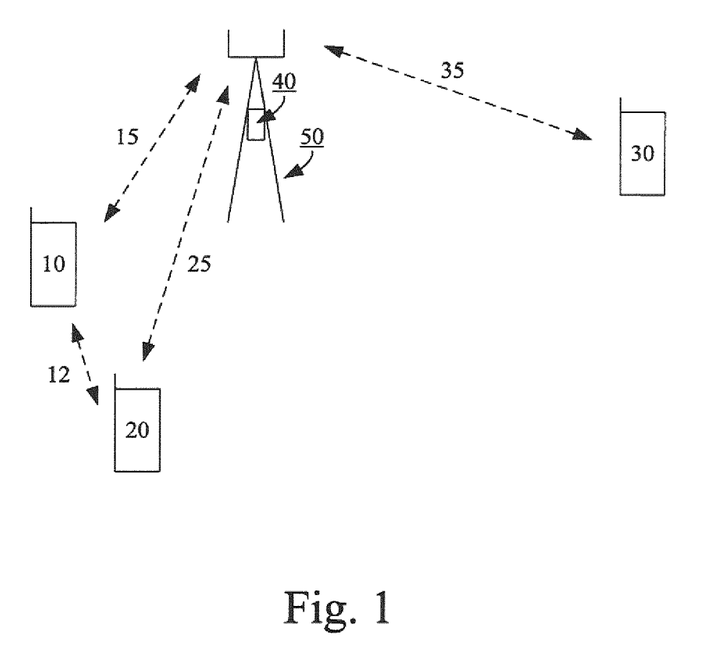
FIG. 1 is a schematic drawing illustrating devices in a network according to some embodiments.

FIG. 1 is a schematic drawing illustrating devices 10, 20, 30 in a network comprising a base station site 50 with a base station (network node) 40. The network node 40 is connected to each of the devices 10, 20, 30 via respective wireless links 15, 25, 35. The devices 10 and 20 have D2D capability. Device 30 may or may not be D2D capable. Since the devices 10 and 20 are geographically close to each other, the radio conditions for direct communication between them are very good in this example. Hence, the network node assists (via links 15 and 25) them to set up and maintain a D2D wireless link 12.

Figure 2A:
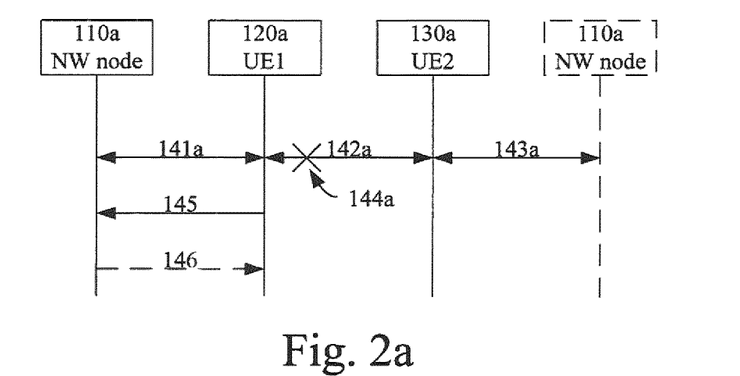
FIGS. 2a and 2b are signaling diagrams illustrating example signaling according to some embodiments.

FIG. 2a is a signaling diagram illustrating example signaling between the nodes involved in a network assisted device-to-device communication scenario. The nodes involved in this example comprise a network node 110a (represented twice in FIG. 2a for clarity reasons) and first and second wireless communication devices (e.g. user equipments, UE) 120a and 130a respectively. In some embodiments, the network node connected to the device 120a may be a different network node than the one connected to the device 130a.

In the network assisted device-to-device communication scenario, communication (e.g. data communication) is ongoing over a device-to-device link between the first and second wireless communication devices as illustrated by 142a. The device-to-device communication is assisted by the network via communication (e.g. control communication) over a device-to-network link between the first wireless communication device and the network node as illustrated by 141a and over a device-to-network link between the second wireless communication device and the network node as illustrated by 143a.

The first wireless communication device 120a monitors the device-to-device link and the device-to-network link between itself and the network node. In this example, the synchronization of the device-to-device link is lost as illustrated by 144a and this event is detected by the first wireless communication device.

The first wireless communication device sends a report to the network node indicative of the change in the device-to-device link conditions, as illustrated by 145. The report may be a synchronization lost report and/or a zero quality report, for example. The network node may reply by sending a synchronization action report to the first wireless communication device as illustrated by 146. Additionally, the first wireless communication device may, partly or fully, cease the communication over the device-to-device link until synchronization is re-established. This may be done autonomously or according to an instruction comprised in the synchronization action report from the network node.

Ceasing (halting, stopping, etc.) communication over the device-to-device link may comprise ceasing communication in both directions or only in one direction. Typically, transmission may be stopped from a device detecting out-of-sync of either its device-to-device link or its device-to-network link, while reception may continue. Other scenarios may also be applicable.

Figure 2B:
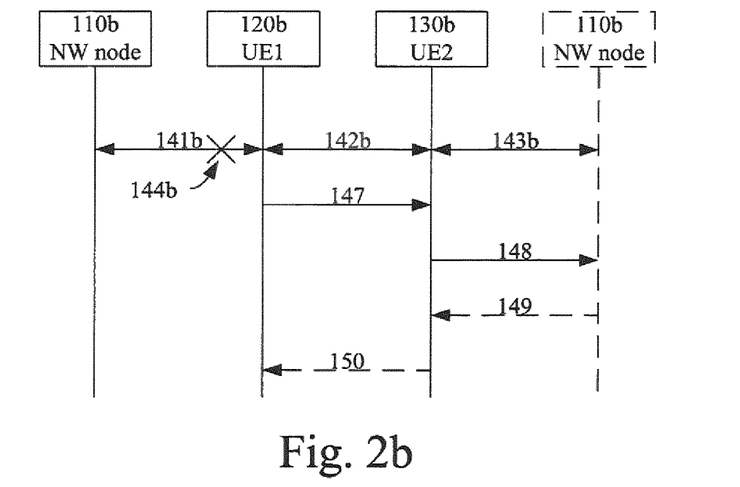

FIG. 2b is also a signaling diagram illustrating example signaling between the nodes involved in a network assisted device-to-device communication scenario. The nodes involved in this example comprise a network node 110b (represented twice in FIG. 2b for clarity reasons) and first and second wireless communication devices (e.g. user equipments, UE) 120b and 130b respectively. In some embodiments, the network node connected to the device 120b may be a different network node than the one connected to the device 130b.

In the network assisted device-to-device communication scenario, communication (e.g. data communication) is ongoing over a device-to-device link between the first and second wireless communication devices as illustrated by 142b. The device-to-device communication is assisted by the network via communication (e.g. control communication) over a device-to-network link between the first wireless communication device and the network node as illustrated by 141b and over a device-to-network link between the second wireless communication device and the network node as illustrated by 143b.

The first wireless communication device 120b monitors the device-to-device link and the device-to-network link between itself and the network node. In this example, the synchronization of the device-to-network link is lost as illustrated by 144b and this event is detected by the first wireless communication device.

The first wireless communication device sends a report indicative of the change in the device-to-device link conditions. The report may be a synchronization lost report, for example. The report may be intended for the network node, but since the device-to-network link between the first wireless communication device and the network node is not reliable, the report is sent on the device-to-device link to the second wireless communication device, as illustrated by 147. The second wireless communication device may retransmit (e.g. relay) the report to the network node over the device-to-network link between the second wireless communication device and the network node, as illustrated by 148. The relaying is optional. In some embodiments, the device may transmit the report to the other device via the device-to-device link and the other device does not relay it to the network node.

The network node may reply by sending a synchronization action report to the first wireless communication device via the second wireless communication device as illustrated by 149 and 150.

Additionally, the first wireless communication device may, partly or fully, cease the communication over the device-to-device link until synchronization is re-established. This may be done autonomously or according to an instruction comprised in the synchronization action report from the network node.

The first and second wireless communication devices 120a, 120b, 130a, 130b of FIGS. 2a and 2b may, for example represent the wireless communication devices 10 and 20 of FIG. 1.

Figure 3A:
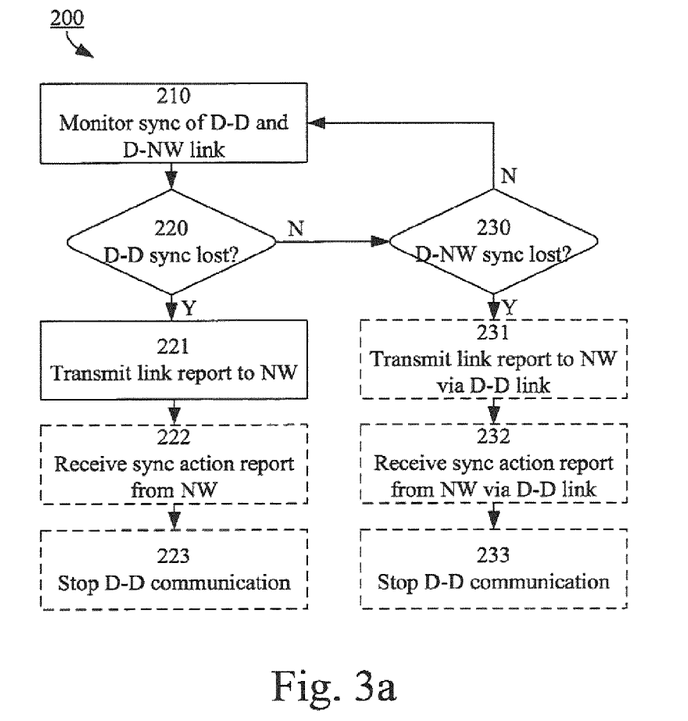
FIGS. 3a and 3b are flowcharts illustrating example methods according to some embodiments.

FIG. 3a is a flowchart illustrating an example method 200 of a wireless communication device engaged in network assisted device-to-device communication. The method 200 may, for example, be performed by the first wireless communication device 120a, 120b as described in connection to FIGS. 2a and 2b.

The method commences in 210, where a device-to-device link and a corresponding device-to-network link are monitored. The monitoring comprises determining (220, 230) whether or not one or both of the links lose their respective synchronization. As long as both links are in-sync (NO paths out from 220 and 230), the monitoring continues according to 210.

If the synchronization of the device-to-device link is lost (YES path out from 220), a link report is transmitted to the network node over the device-to-network link as illustrated in 221. The report may be a synchronization lost report and/or a zero quality report, for example. Optionally, a synchronization action report may be received from the network node over the device-to-network link as illustrated in 222. This report may be indicative of actions that should be performed by the wireless communication device to mitigate problems caused by the device-to-device link being out-of-sync. For example, the report may comprise instructions relating to how the synchronization may be re-established and/or instructions to switch to cellular communication (and/or other carrier frequency and/or radio access technology). The report may alternatively or additionally comprise instructions to partly or fully cease communication over the device-to-device link to limit uncontrolled interference generation. Accordingly, the communication over the device-to-device link may optionally be partly or fully ceased as illustrated in 223. The cease of communication may be performed as a response to the synchronization action report or it may be determined autonomously by the wireless communication device.

If the synchronization of the device-to-network link is lost (YES path out from 230) various actions with regard to the device-to-device link may be performed. For example, a link report may be transmitted to the network node over the device-to-device link (and optionally relayed to the network node by the other device of the device-to-device communication) as illustrated in 231. The report nay be a synchronization lost report, for example. Optionally, a synchronization action report may be received from the network node over the device-to-device link (relayed by the other device of the device-to-device communication) as illustrated in 232. This report may be indicative of actions that should be performed by the wireless communication device to mitigate problems caused by the device-to-network link being out-of-sync. For example, the report may comprise instructions relating to how the synchronization may be re-established. The report may alternatively or additionally comprise instructions to partly or fully cease communication over the device-to-device link to limit uncontrolled interference generation. Accordingly, the communication over the device-to-device link may optionally be partly or fully ceased as illustrated in 233. The cease of communication may be performed as a response to the synchronization action report or it may be determined autonomously by the wireless communication device.

The determination of loss of synchronization (220, 230) may be performed in the order presented in FIG. 3a, in another order, or in parallel. The ceasing of communication over the device-to-device communication link (223) may, if determined by the wireless communication device autonomously, be performed as illustrated in FIG. 3a, before the link report transmission (221), or between the transmission of the link report (221) and the reception of the synchronization action report (222).

Ceasing of communication (partially or fully) on the device-to-device link has the advantage of limiting uncontrolled interference for other communications ongoing on the cell (using licensed or unlicensed spectrum). For example, if the device-to-network link is out-of-sync no power control commands (e.g. explicit power values, a maximum transmission power. TPC like commands, etc.) for the D2D link could be received from the network via that link. Hence, the device-to-device signaling power is not controlled by the network. In one embodiment, power control commands for the D2D link could be received from the network by relaying information via the other wireless communication device.

Figure 3B:
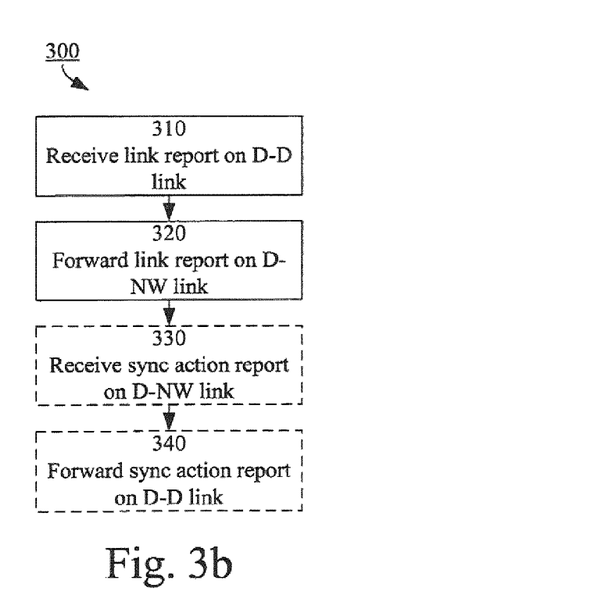

FIG. 3b is a flowchart illustrating an example method 300 of a wireless communication device engaged in network assisted device-to-device communication. The method 300 may, for example, be performed by the second wireless communication device 130b as described in connection to FIG. 2b. It is noted that a same device may be capable of performing both the methods of FIGS. 3a and 3b, and thus may take any of the roles of the first wireless communication device (120a, 120b) and the second wireless communication device (130a, 130b) of FIGS. 2a and 2b.

The method commences in 310, where a link report is received from the other wireless communication device of the device-to-device communication. The report may be a synchronization lost report, for example. The report is forwarded (e.g. relayed or re-transmitted) to the network node over the device-to-network link as illustrated in 320.

Optionally, a synchronization action report may be received from the network node over the device-to-device link as illustrated in 330. This report may be indicative of actions that should be performed by the wireless communication device and/or by the other wireless communication device to mitigate problems caused by the device-to-network link being out-of-sync. For example, the report may comprise instructions relating to how the synchronization may be re-established and/or instructions to switch to cellular communication (and/or other carrier frequency and/or radio access technology). Another possibility is that the report comprises power control commands from the network to either of the wireless communication devices. The report may alternatively or additionally comprise instructions to partly or fully cease communication over the device-to-device link to limit uncontrolled interference generation. When applicable (e.g. if the report he report is indicative of actions that should be performed by the other wireless communication device) the report is forwarded (e.g. relayed or re-transmitted) to the other wireless communication device over the device-to-device link as illustrated in 340.

It should be noted that the examples herein mainly refer to the situation when a single network node is involved in the network assisted device-to-device communication. It is noted that this network node may be any suitable network node, e.g. a base station or (e)NodeB, a network controller node, a relay node, etc. A network node may be in control of D2D resources relating to one or several base stations. For example, a network controller may allocate resources to devices operating under different base stations.

In some embodiments, a first network node is in control of a first set of resources and a second network node is in control of a second set of resources. The first and second sets may coincide, may be overlapping or may be non-overlapping. If a first device under control by the first network node and a second device under control by the second network node may set up a D2D connection, there can either be a change of node (e.g. cell change) for one of the devices or the D2D connection can be assisted by one of the network nodes using the other network node as a relay when required.

Figure 4:
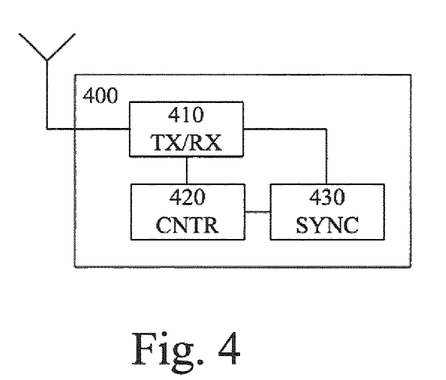
FIG. 4 is a block diagram illustrating an example arrangement according to some embodiments.

FIG. 4 is a block diagram illustrating an example arrangement 400 according to some embodiments. The arrangement may, for example, be comprised in one or more of the wireless communication devices 10 and 20 of FIG. 1. Additionally or alternatively, the arrangement may be adapted to perform one or more of the methods as described in connection with FIGS. 3a and 3b.

The arrangement comprises a transceiver 410, a synchronization monitor 430 and a controller 420. It is noted that any of the units of FIG. 4 may be implemented as single or multiple units. Furthermore, two or more of the units of FIG. 4 may be jointly implemented in a single unit. For example, the transceiver may be implemented as one or more separate transmitters and one or more separate receivers. In some embodiments, the transceiver comprises two transceivers—one for the device-to-device link and one for the device-to-network link. On other embodiments, the same transceiver is used for both the device-to-device link and the device-to-network link. In some implementations, the synchronization monitor and the controller may be comprised in a single unit.

The transceiver is adapted to communicate over the device-to-device communication link and over the device-to-network communication link, and the synchronization monitor is adapted to monitor a synchronization of the respective links. The synchronization monitor may, for example, be adapted to determine whether the synchronization of any of the communication links is lost based on a signal quality (e.g. SNR, SNIR, BER, BLER, CRC, etc) of a signal received over the respective communication link.

When synchronization of one of the links is detected, the controller may be adapted to cause the transceiver to transmit a report (e.g. a synchronization lost report and/or a zero quality report) relating to the synchronization loss to the network node over the other link. Additionally or alternatively, the controller may be adapted to otherwise adjust the communication of the device-to-device communication link. For example, communication over the device-to-device communication link may be partly or fully ceased (at least until synchronization is re-established).

The transceiver may also be adapted to receive a synchronization lost report from the network (either directly or via the second wireless communication device depending on which link is reliable). As described above, this report may be indicative of actions that should be performed by the wireless communication device and/or by the other wireless communication device to mitigate problems caused by the device-to-network link being out-of-sync. The controller may be adapted to cause these actions to be performed. For example, the controller may be adapted to cause the transceiver to forward the report to another wireless communication device involved in the device-to-device communication.

As an alternative or an addition to the synchronization action report from the network, some or all actions to be performed when out-of-sync is detected for one of the links may be determined already at the D2D connection set-up or (for device-to-network out-of-sync) during the D2D connection. The configuration of these embodiments may be signaled from the network node, for example. In some embodiments, some or all actions to be performed when out-of-sync is detected for one of the links may even be preconfigured in the wireless communication device. Thus, the device is already aware of at least some of the action(s) to take if one of the links goes out-of-synchronization and the synchronization action report form the network may be partly or fully omitted. For these embodiments, some or all of the appropriate out-of-synchronization actions may be performed before notifying the network node. As an example, a device losing the network connection might start to scan for a suitable frequencies to use for WLAN in the ISM band while (or before) the other device in the device-to-device communication is notified (notification may comprise out-of-sync information and information regarding which frequencies are being scanned). The other device may then notify the network in turn while (or after) it starts to establish a new connection in the ISM band according to the notification information.

The described embodiments of the invention and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of the invention.

The invention may be embodied within an electronic apparatus (e.g. a wireless communication device) comprising circuitry/logic or performing methods according to any of the embodiments of the invention. The electronic apparatus may, for example, be a portable or handheld mobile radio communication equipment, a mobile radio terminal, a mobile telephone, a communicator, an electronic organizer, a smartphone, a computer, a notebook, an embedded drive, a modem, a mobile gaming device, or any other wireless communication device.

Figure 5:
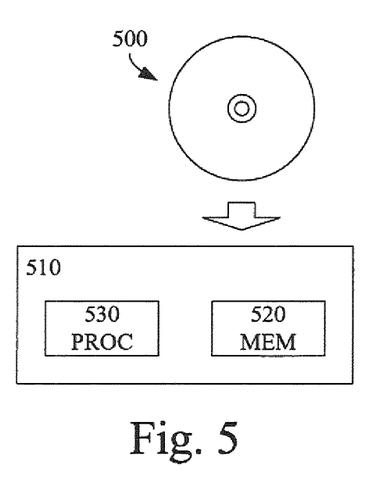
FIG. 5 is a schematic drawing illustrating a computer readable medium according to some embodiments.

According to some embodiments of the invention, a computer program product comprises a computer readable medium such as, for example, a diskette or a CD-ROM as illustrated by 500 in FIG. 5. The computer readable medium 500 may have stored thereon a computer program comprising program instructions. The computer program may be loadable into a data-processing unit 530, which may, for example, be comprised in a mobile terminal 510. When loaded into the data-processing unit 530, the computer program may be stored in a memory 520 associated with or integral to the data-processing unit. According to some embodiments, the computer program may, when loaded into and run by the data-processing unit, cause the data-processing unit to execute method steps according to, for example, the methods shown in any of the FIGS. 3*a* and 3*b*.

The invention has been described herein with reference to various embodiments. However, a person skilled in the art would recognize numerous variations to the described embodiments that would still fall within the scope of the invention. For example, the method embodiments described herein describes example methods through method steps being performed in a certain order. However, it is recognized that these sequences of events may take place in another order without departing from the scope of the invention. Furthermore, some method steps may be performed in parallel even though they have been described as being performed in sequence.

In the same manner, it should be noted that in the description of embodiments of the invention, the partition of functional blocks into particular units is by no means limiting to the invention. Contrarily, these partitions are merely examples. Functional blocks described herein as one unit may be split into two or more units. In the same manner, functional blocks that are described herein as being implemented as two or more units may be implemented as a single unit without departing from the scope of the invention.

Hence, it should be understood that the limitations of the described embodiments are merely for illustrative purpose and by no means limiting. Instead, the scope of the invention is defined by the appended claims rather than by the description, and all variations that all within the range of the claims are intended to be embraced therein.

The invention claimed is:

1. A method of a first wireless communication device adapted to perform network assisted device-to-device communication, wherein a device-to-device communication connection comprises a device-to-device communication link between the first wireless communication device and a second wireless communication device and a device-to-network communication link between the first wireless communication device and a network node, the method comprising:
monitoring a synchronization of the device-to-device communication link to detect a synchronization of the device-to-device communication link being lost;
responding to the synchronization of the device-to-device communication link being lost by transmitting a device-to-device communication link report to the network node over the device-to-network communication link;
monitoring a synchronization of the device-to-network communication link to detect a synchronization of the device-to-network communication link being lost; and
responding to the synchronization of the device-to-network communication link being lost by adapting a communication of the device-to-device communication link.

2. The method of claim 1 wherein the device-to-device communication link report comprises one or more of a synchronization lost report and a zero quality report.

3. The method of claim 1 further comprising, responding to the synchronization of the device-to-device communication link being lost by ceasing communication over the device-to-device communication link.

4. The method of claim 1 wherein adapting a communication of the device-to-device communication link comprises one or more of:
transmitting a synchronization lost report to the second wireless communication device over the device-to-device communication link; and
ceasing communication over the device-to-device communication link.

5. The method of claim 1 further comprising determining whether the synchronization of the device-to-device communication link is lost and determining whether the synchronization of the device-to-network communication link is lost is based on a signal quality of a signal received over the respective communication link.

6. A non-transitory computer readable medium, having thereon a computer program comprising program instructions that, when executed by a data-processing unit, cause the data-processing unit to perform a method of a first wireless communication device adapted to perform network assisted device-to-device communication, wherein a device-to-device communication connection comprises a device-to-device communication link between the first wireless communication device and a second wireless communication device and a device-to-network communication link between the first wireless communication device and a network node, the method comprising:

monitoring a synchronization of the device-to-device communication link to detect a synchronization of the device-to-device communication link being lost;

responding to the synchronization of the device-to-device communication link being lost by transmitting a device-to-device communication link report to the network node over the device-to-network communication link;

monitoring a synchronization of the device-to-network communication link to detect a synchronization of the device-to-network communication link being lost; and responding to the synchronization of the device-to-network communication link being lost by adapting a communication of the device-to-device communication link.

7. An arrangement of a first wireless communication device adapted to perform network assisted device-to-device communication, wherein a device-to-device communication connection comprises a device-to-device communication link between the first wireless communication device and a second wireless communication device and a device-to-network communication link between the first wireless communication device and a network node, the arrangement comprising:

a transceiver adapted to communicate over the device-to-device communication link and the device-to-network communication link;

a synchronization monitor adapted to monitor a synchronization of the device-to-device communication link to detect a synchronization of the device-to-device communication link being lost and to monitor a synchronization of the device-to-network communication link to detect a synchronization of the device-to-network communication link being lost;

a controller adapted to cause the transceiver to:
responding to the synchronization of the device-to-device communication link being lost by transmitting a device-to-device communication link report to the network node over the device-to-network communication link; and responding to the synchronization of the device-to-network communication link being lost by adapting a communication of the device-to-device communication link.

8. The arrangement of claim 7 wherein the device-to-device communication link report comprises one or more of a synchronization lost report and a zero quality report.

9. The arrangement of claim 7 wherein the controller is further adapted to respond to the synchronization of the device-to-device communication link being lost by causing the transceiver to cease communication over the device-to-device communication link.

10. The arrangement of claim 7 wherein the controller is adapted to respond to the synchronization of the device-to-network communication link being lost by causing the transceiver to transmit a synchronization lost report to the second wireless communication device over the device-to-device communication link.

11. The arrangement of claim 7 wherein the controller is adapted to respond to the synchronization of the device-to-network communication link being lost by causing the transceiver to cease communication over the device-to-device communication link.

12. The arrangement of claim 7 wherein the transceiver is further adapted to receive a synchronization lost report from the second wireless communication device over the device-to-device communication link and transmit the received synchronization lost report to the network node over the device-to-network communication link.

13. The arrangement of claim 7 wherein the synchronization monitor is further adapted to determine whether the synchronization of the device-to-device communication link is lost and determine whether the synchronization of the device-to-network communication link is lost based on a signal quality of a signal received over the respective communication link.

14. A wireless communication device comprising the arrangement of claim 7.

* * * * *

UNITED STATES PATENT AND TRADEMARK OFFICE
CERTIFICATE OF CORRECTION

PATENT NO. : 9,585,179 B2
APPLICATION NO. : 14/399950
DATED : February 28, 2017
INVENTOR(S) : Lindoff et al.

It is certified that error appears in the above-identified patent and that said Letters Patent is hereby corrected as shown below:

On the Title Page

In Item (72), under "Inventors", in Column 1, Line 1, delete "Bjarred" and insert -- Bjärred --, therefor.

In Item (56), under "U.S. PATENT DOCUMENTS", in Column 2, Line 2, delete "Periyalwar" and insert -- Periyalwar et al. --, therefor.

On Page 2, in Item (57), under "ABSTRACT", in Column 1, Line 3, delete "adapting)" and insert -- adapting --, therefor.

On Page 2, in Item (56), under "U.S. PATENT DOCUMENTS", in Column 1, Line 3, delete "Yu" and insert -- Yu et al. --, therefor.

On Page 2, in Item (56), under "U.S. PATENT DOCUMENTS", in Column 1, Line 9, delete "Van Phan" and insert -- Van Phan et al. --, therefor.

On Page 2, in Item (56), under "U.S. PATENT DOCUMENTS", in Column 1, Line 11, delete "Koskela" and insert -- Koskela et al. --, therefor.

On Page 2, in Item (56), under "OTHER PUBLICATIONS", in Column 2, Line 14, delete "Bacceli," and insert -- Baccelli, --, therefor.

In the Specification

In Column 1, Line 19, delete "device to device" and insert -- device-to-device --, therefor.

In Column 1, Line 61, delete "mount" and insert -- amount --, therefor.

Signed and Sealed this
Fifteenth Day of August, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,585,179 B2

In Column 2, Line 10, delete "system" and insert -- system, --, therefor.

In Column 2, Line 15, delete "concoction" and insert -- connection --, therefor.

In Column 2, Line 23, delete "example" and insert -- example, --, therefor.

In Column 2, Line 54, delete "aspect" and insert -- aspect, --, therefor.

In Column 3, Line 21, delete "more of" and insert -- more of: --, therefor.

In Column 7, Line 66, delete "example" and insert -- example, --, therefor.

In Column 8, Line 43, delete "nay be" and insert -- may be --, therefor.

In Column 9, Line 10, delete "power." and insert -- power, --, therefor.

In Column 9, Line 49, delete "the report he report" and insert -- the report --, therefor.

In Column 10, Line 34, delete "(e.g. SNR," and insert -- (e.g. SIR, SNR, SINR --, therefor.

In Column 11, Line 4, delete "form the" and insert -- from the --, therefor.

In Column 11, Line 9, delete "frequencies" and insert -- frequency --, therefor.

In Column 12, Line 11, delete "that all" and insert -- that fall --, therefor.